(12) United States Patent
Reutter

(10) Patent No.: US 9,663,953 B2
(45) Date of Patent: May 30, 2017

(54) BUILDING MODULE AND METHOD FOR UTILIZING THERMAL ENERGY

(71) Applicant: Odilo Reutter, Stuttgart (DE)

(72) Inventor: Odilo Reutter, Stuttgart (DE)

( * ) Notice: Subject to any disclaimer, the term of this patent is extended or adjusted under 35 U.S.C. 154(b) by 0 days.

(21) Appl. No.: 14/632,738

(22) Filed: Feb. 26, 2015

(65) Prior Publication Data
US 2015/0167298 A1    Jun. 18, 2015

Related U.S. Application Data

(63) Continuation of application No. PCT/EP2013/067916, filed on Aug. 29, 2013.

(30) Foreign Application Priority Data

Aug. 31, 2012    (DE) .................. 10 2012 017 211

(51) Int. Cl.
*E04C 2/00*    (2006.01)
*E04C 2/52*    (2006.01)
(Continued)

(52) U.S. Cl.
CPC ............ *E04C 2/525* (2013.01); *E04B 1/7604* (2013.01); *F24J 2/0433* (2013.01); *F24J 2/0444* (2013.01);
(Continued)

(58) Field of Classification Search
CPC .. F24J 2/04; F24J 2/0422; F24J 2/0433; F24J 2/0444; F24J 2/045; F24J 2/0488;
(Continued)

(56) References Cited

U.S. PATENT DOCUMENTS 3,996,919 A  *  12/1976  Hepp ............................. 126/618
4,014,313 A  *   3/1977  Pedersen ....................... 126/660
(Continued)

FOREIGN PATENT DOCUMENTS

DE        2830745 A1    1/1980
DE       10251921 A1    5/2004
(Continued)

OTHER PUBLICATIONS

Machine translation of Foreign reference EP 2587182, obtained from https://patentscope.wipo.int/search/en/detail.jsf?docId=EP82188885&recNum=1&maxRec=&office=&prevFilter=&sortOption=&queryString=&tab=PCTDescription (last accessed on Jan. 26, 2017).*

(Continued)

*Primary Examiner* — Theodore Adamos
(74) *Attorney, Agent, or Firm* — Reising Ethington, P.C.

(57) ABSTRACT

The present invention relates to a building module, in particular a facade module, roof module or window module, for utilizing solar energy and/or for thermal insulation. The building module comprises an inner pane and an outer pane, wherein an intermediate space is formed between the inner pane and the outer pane. A heat transfer element is arranged in the intermediate space and has at least one functional surface for absorbing thermal radiation and/or for controlling the temperature of the intermediate space. A fluid line is provided in which a heat transport medium is conducted, wherein a thermal contact is formed between the heat transfer element and the heat transport medium in order to exchange heat between the heat transfer element and the heat transport medium. The functional surface and the fluid line, to which the thermal contact is assigned, are arranged juxtaposed to one another when the functional surface is viewed in a perpendicular direction.

21 Claims, 12 Drawing Sheets

(51) Int. Cl.
*E04B 1/76* (2006.01)
*F24J 2/04* (2006.01)
*F24J 2/05* (2006.01)
*F24J 2/24* (2006.01)
*F24J 2/50* (2006.01)

(52) U.S. Cl.
CPC .............. *F24J 2/0494* (2013.01); *F24J 2/05* (2013.01); *F24J 2/24* (2013.01); *F24J 2/507* (2013.01); *E04C 2002/001* (2013.01); *Y02B 10/22* (2013.01); *Y02E 10/44* (2013.01)

(58) Field of Classification Search
CPC ........ F24J 2/245; F24J 2/34; F24J 2/46; F24J 2/0494; F24J 2002/0411; F24J 2002/0416; F24J 2002/261; F24J 2002/263; F24J 2/05; F24J 2/24; F24J 2/507; Y02E 10/44; Y02B 10/20; Y02B 10/22; F28D 20/00; E04C 2/525; E04C 2002/001; E04B 1/7604
USPC ....... 52/171.3, 173.3, 204.593, 204.5, 204.6; 136/248, 244, 259; 126/621, 633, 628, 126/634, 635, 636, 637, 639, 641
See application file for complete search history.

(56) References Cited

U.S. PATENT DOCUMENTS

| | | | | |
|---|---|---|---|---|
| 4,090,497 A | * | 5/1978 | Kelly | 126/643 |
| 4,091,592 A | * | 5/1978 | Berlad et al. | 52/786.1 |
| 4,137,098 A | * | 1/1979 | Field | 136/248 |
| 4,144,931 A | * | 3/1979 | Medico, Jr. | 165/48.2 |
| 4,207,869 A | * | 6/1980 | Hart | 126/710 |
| 4,220,139 A | * | 9/1980 | Ramsden | 126/595 |
| 4,232,731 A | * | 11/1980 | Kaplow et al. | 165/48.2 |
| 4,378,786 A | * | 4/1983 | Comeau, Jr. | 126/631 |
| 4,421,098 A | * | 12/1983 | Meta | 126/604 |
| 4,455,998 A | * | 6/1984 | Kroontje et al. | 126/635 |
| 4,527,548 A | * | 7/1985 | Gustafson | 126/607 |
| 4,577,619 A | * | 3/1986 | Howe, Jr. | 126/629 |
| 5,221,363 A | * | 6/1993 | Gillard | 136/248 |
| 5,373,838 A | * | 12/1994 | Ho | 126/569 |
| 5,513,696 A | * | 5/1996 | Baer | 165/10 |
| 5,647,433 A | * | 7/1997 | Sasaki | 165/148 |
| 6,459,033 B1 | * | 10/2002 | Muller | 136/244 |
| 8,230,649 B2 | | 7/2012 | Kapany | |
| 8,650,877 B1 | * | 2/2014 | Gustafson | 60/641.8 |
| 2008/0308152 A1 | * | 12/2008 | Grip | 136/259 |
| 2012/0031018 A1 | * | 2/2012 | Kapany | 52/173.3 |
| 2012/0204860 A1 | * | 8/2012 | Crawmer | 126/635 |
| 2012/0279147 A1 | * | 11/2012 | Kapany | 52/171.3 |
| 2013/0160758 A1 | * | 6/2013 | Kuo et al. | 126/635 |
| 2013/0167834 A1 | * | 7/2013 | Kuo et al. | 126/635 |
| 2013/0298899 A1 | * | 11/2013 | Kuo et al. | 126/651 |

FOREIGN PATENT DOCUMENTS

| | | |
|---|---|---|
| DE | 10251921 B4 | 9/2006 |
| DE | 102006000668 A1 | 7/2007 |
| DE | 102006000668 B4 | 8/2008 |
| DE | 102008047327 A1 | 3/2010 |
| DE | 102008047327 B4 | 12/2010 |
| EP | 0249919 A2 | 12/1987 |
| EP | 0249919 A3 | 12/1987 |
| EP | 2587182 A2 | 5/2013 |
| EP | 2587182 A3 | 9/2014 |
| FR | 2942029 A1 | 8/2010 |
| FR | 2942029 B1 | 5/2012 |
| WO | WO2011048595 A2 | 4/2011 |
| WO | WO2011057316 A2 | 5/2011 |
| WO | WO2011057316 A3 | 5/2011 |

OTHER PUBLICATIONS

English Translation of the International Search Report dated Mar. 12, 2015, 13 pages.
International Search Report dated Dec. 2, 2013, 13 pages.
Office Action from European Patent Office for Application No. 13 753 334.5 Dated Dec. 5, 2016, 6 pages.

* cited by examiner

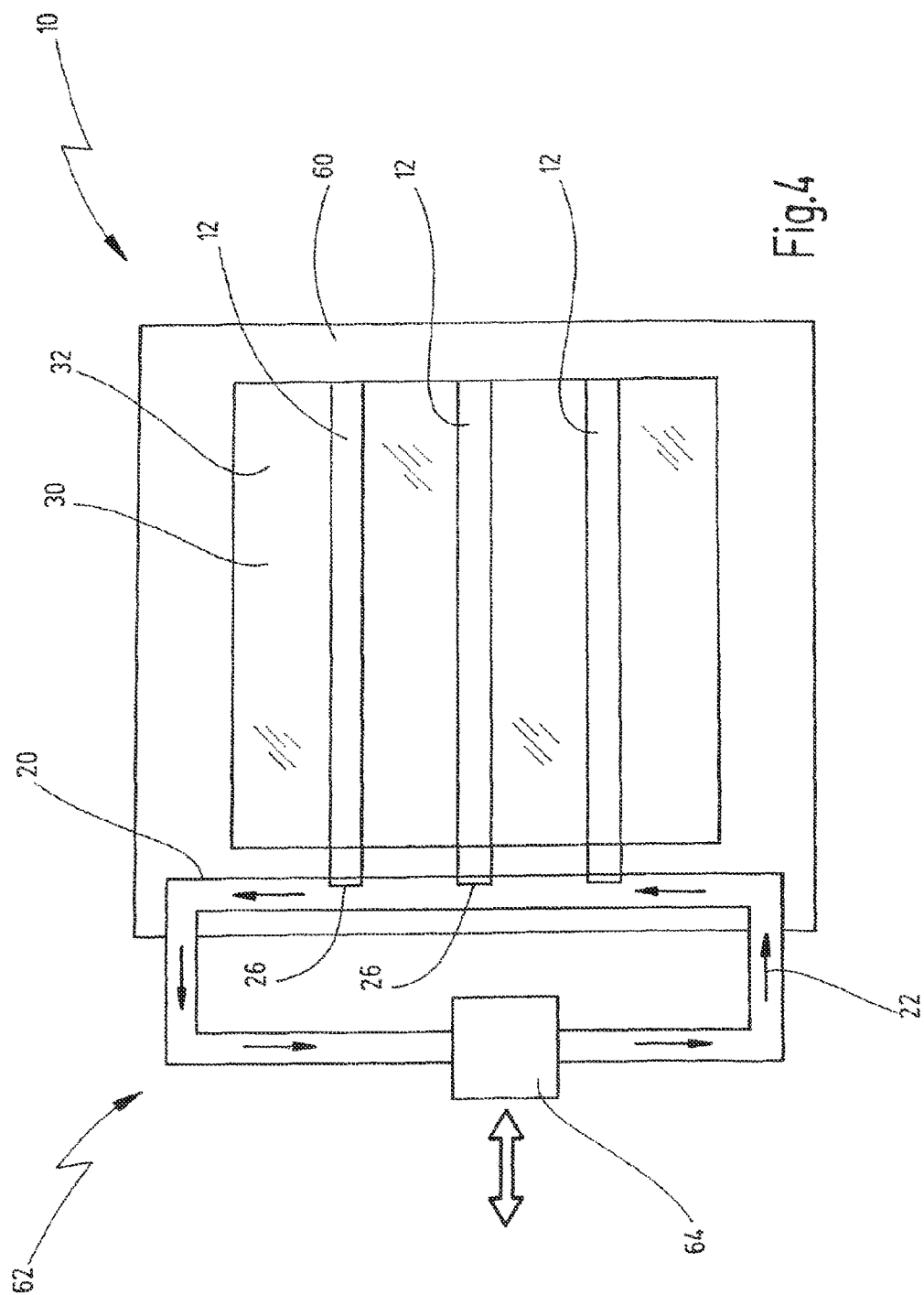

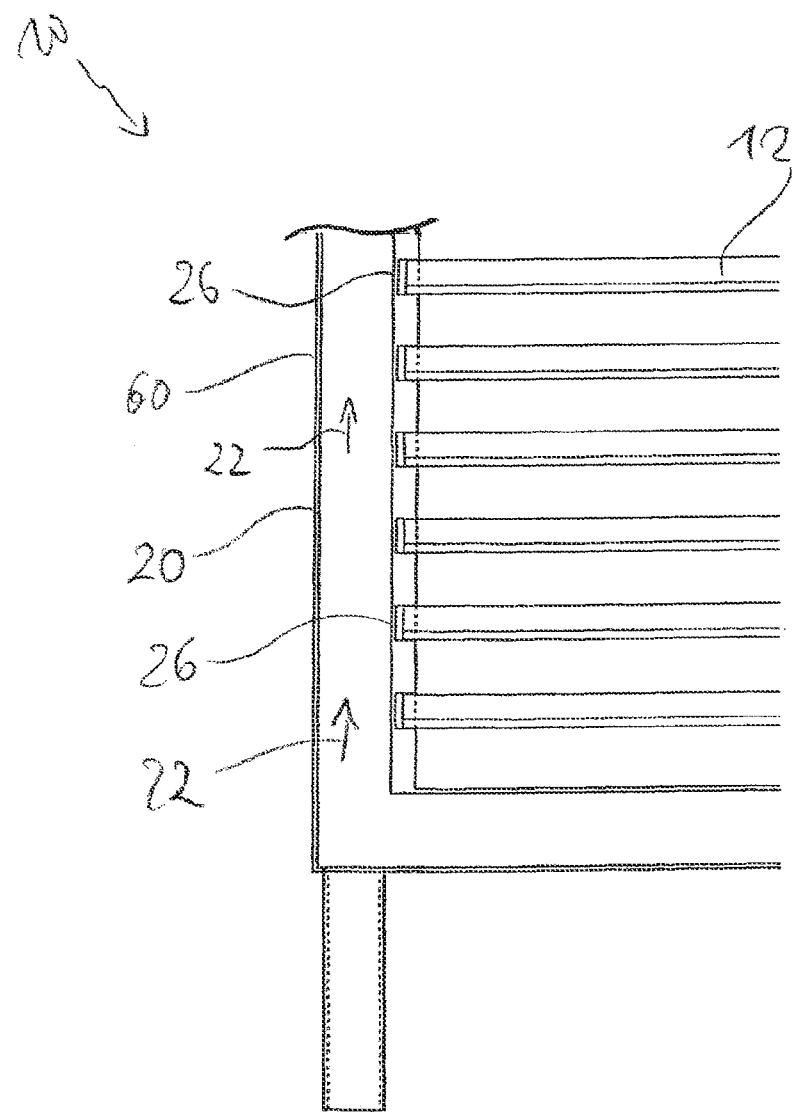

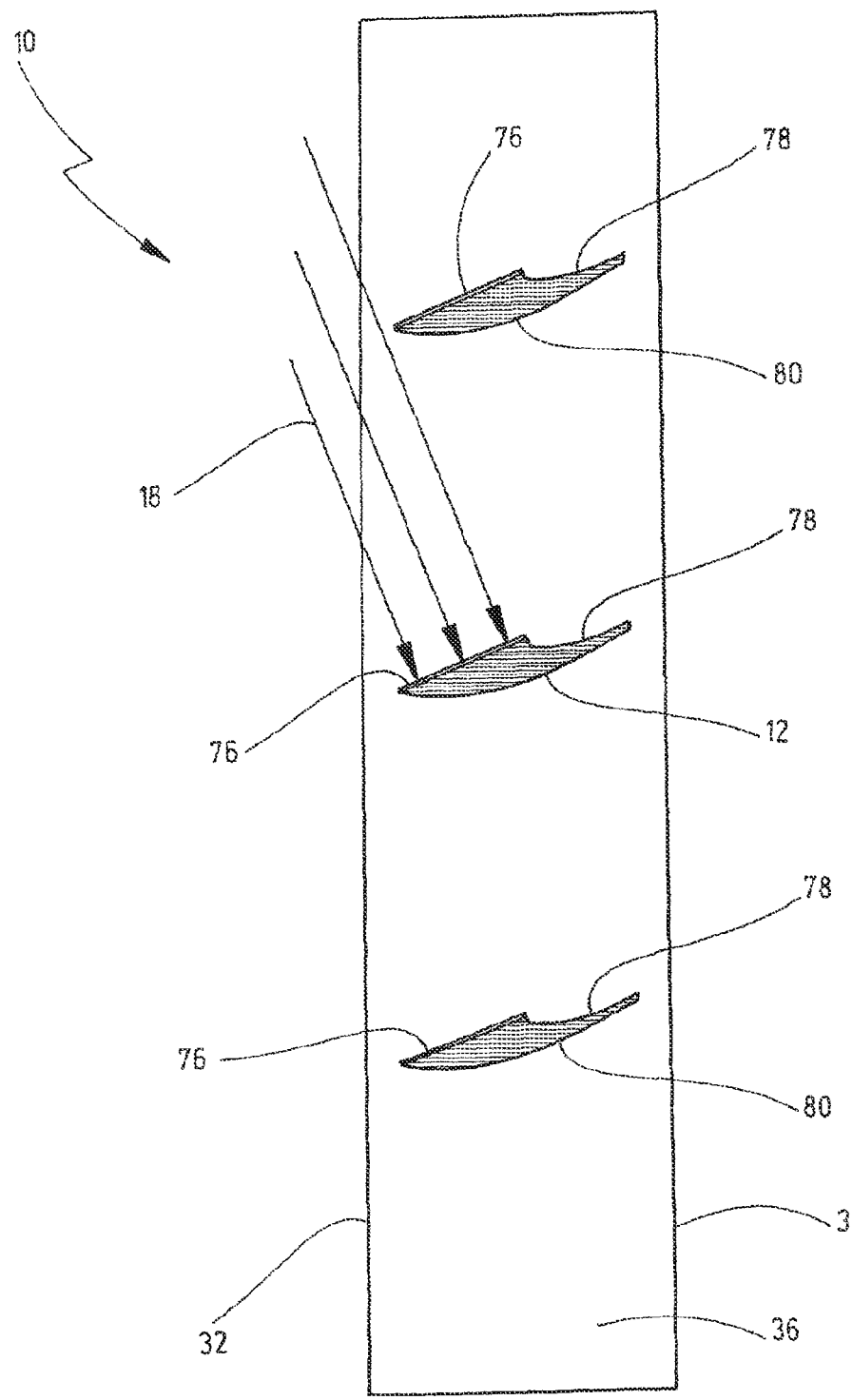

BUILDING MODULE AND METHOD FOR UTILIZING THERMAL ENERGY

CROSS REFERENCES TO RELATED APPLICATIONS

This is a continuation application of International patent application PCT/EP 2013/067916, filed Aug. 29, 2013, which claims the priority of German patent application DE 10 2012 017 211.7, filed Aug. 31, 2012.

BACKGROUND OF THE INVENTION

The present invention relates to a building module, in particular a facade module, roof module or window module, for utilizing solar energy and/or for thermal insulation, having an inner pane and an outer pane, wherein an intermediate space is formed between the inner pane and the outer pane, a heat transfer element, in particular an absorber element, which is arranged in the intermediate space and has at least one functional surface for absorbing thermal radiation and/or for controlling the temperature of the intermediate space, and a fluid line in which a heat transport medium is conducted, wherein a thermal contact is formed between the heat transfer element and the heat transport medium in order to exchange heat between the heat transfer element and the heat transport medium.

The present invention further relates to a method for producing a building module, in particular a facade module, roof module or window module, for utilizing solar energy and/or for thermal insulation, having the steps of: providing a fluid line in which a heat transport medium is conductible, providing a heat transfer element, in particular an absorber element, which has at least one functional surface for absorbing heat radiation and/or for controlling the temperature of ambient air, and connecting an inner pane and an outer pane to the fluid line such that an intermediate space, in which the heat transfer element is arranged, is formed between the inner pane and the outer pane.

Finally, the present invention relates to a heat distribution arrangement for a building having a plurality of building modules according to the present invention and a fluid system which, in order to exchange heat between the building modules, connects the fluid lines of the building modules at least thermally together.

Building modules of this type are usually fastened to buildings and serve to convert solar rays into thermal energy and/or electrical energy and to utilize the thermal and/or electrical energy obtained in this way in the building and/or to thermally insulate the building.

It is generally known from the prior art to arrange solar collectors in windows or in facade elements in order to convert the incident solar radiation into thermal energy. In this case, the solar collectors are usually in the form of elongate slats in which a fluid line is formed, a heat transport liquid flowing through said fluid line in order to transport away the heat which is produced in the solar collectors by the solar rays and to make it utilizable for heating for example a building interior. A window solar collector of this kind is known for example from DE 102 51 921 B4.

Alternatively, a building interior can also be heated by means of solar collector slats, as known from DE 28 30 745. In this case, the slats do not have a fluid line in order to heat the building interior via a heat transport medium, but merely have room air of the building interior flowing around them in order to transport away the heat that arises in the slats as a result of the solar irradiation. In this case, the solar collector slats are arranged between two glass panes, wherein vents are formed in each case at the lower end of the glass panes and at the upper end of the glass panes in order to allow cold air to flow in between the glass panes and to allow warm air to flow out at the top end.

Finally, it is known from DE 10 2008 047 327 B4 to form solar collector slats with a fluid system for heating a heat transport medium, with a photovoltaic unit for generating electrical energy, and with a further functional surface in order for example to reflect solar rays into the interior of a building.

A disadvantage with the solar collectors that are known from the prior art is that the collector slats are technically complicated and, on account of the large diameter brought about by the fluid line system, restrict the view through a window equipped therewith and at the same time greatly increase the thickness of the entire window module. Furthermore, it is a disadvantage that, in order to insulate the particular building interior, an additional insulating pane has to be provided or the intermediate space in which the collector slats are arranged has to be evacuated with a large technical effort in order to reduce the heat transmission through the pane, and the heat transmission cannot be set individually.

SUMMARY OF THE INVENTION

It is therefore an object of the present invention to provide an improved building module for utilizing solar energy, wherein the building module is less technically complicated and has heat transmission elements with a small overall size. Furthermore, it is the object of the invention to provide a building module with which the heat transmission through the building module can be set with low technical effort.

It is furthermore an object of the present invention to provide a method for producing such a building module.

This object is achieved in the case of the building module mentioned at the beginning in that the functional surface and the fluid line, to which the thermal contact is assigned, are arranged juxtaposed to one another when the functional surface is viewed in a perpendicular direction.

According to a second aspect, the abovementioned object is achieved in the case of the building module mentioned at the beginning in that the intermediate space is formed in a gastight manner and is filled with a gaseous medium so that heat is exchangeable between the heat transport medium and the gaseous medium.

Finally, this object is achieved in the case of the method mentioned at the beginning in that a thermal contact is formed between the heat transfer element and the fluid line such that the functional surface and the fluid line are arranged juxtaposed to one another when the functional surface is viewed in a perpendicular direction. According to the invention, the expression "arranged juxtaposed to one another" is understood as meaning that the fluid line and the functional surface can be disposed directly against one another or can be arranged in a manner spaced apart from one another.

Since the functional surface of the heat transfer element and the fluid line to which the thermal contact is assigned are arranged juxtaposed to one another, the heat is exchanged in the lateral direction by means of heat conduction between the functional surface and the thermal contact, with the result that the heat transfer element can be formed without an integrated fluid line with a particularly small diameter, can be produced with low technical effort for example as an elongate metal element or metal plate and can be mounted with low technical effort. As a result, the technical complexity of the building module can be reduced overall and the installation space which is necessary for the heat transfer element can be reduced.

Since, according to the second aspect of the present invention, the intermediate space is formed in a gastight manner and is filled with a gaseous medium, heat can be exchanged between the heat transport medium and the heat transfer element and between the functional surface and the gaseous medium such that the gaseous medium can be heated or cooled and the temperature of the gaseous medium can be set or adapted to an interior temperature, with the result that a flow of heat in the inner pane can be regulated. As a result, in particular the insulating action of the building module can be improved with low technical effort.

In a preferred embodiment, the heat transfer element is formed as a heat conductor for the thermal connection between the functional surface and the thermal contact.

As a result, the thermal connection between the functional surface and the thermal contact can be formed with low technical effort and can be embodied in particular with a small size.

It is furthermore preferred for the heat transfer element to be formed of an elongate element, wherein the thermal contact and the functional surface are formed in a manner offset with respect to one another in the axial direction of the heat transfer element.

As a result, in the embodiment as a window module, the view through the window module can be improved since the elongate elements do not cover the entire module area.

It is furthermore preferred for the thermal contact to be formed on an end section of the heat transfer element. In this case, it is particularly preferred for the thermal contact to be formed merely at the one end section of the heat transfer element.

As a result, the heat transfer element can be mechanically mounted at the fluid line and at the same time form the thermal contact as heat transfer.

It is furthermore preferred for the thermal contact to be formed at an end face of the heat transfer element.

As a result, the thermal contact between the heat transfer element and the fluid line can be formed with simple means since the heat transfer element has to be fastened to the fluid line merely by way of its end face.

In a preferred embodiment, the heat transfer element has a free end section at which at least a part of the functional surface is formed.

As a result a view through the building module can be improved since the heat transfer element does not extend over the entire width of the building module.

Alternatively, it is preferred for the heat transfer element to have a thermal contact at each of two opposite end sections, said thermal contacts each being assigned to a fluid line. In this case, it is particularly preferred for the thermal contact to be formed merely at the two end sections of the heat transfer element.

As a result, the transport of the thermal energy in the heat transfer element can be improved since two thermal contacts afford improved heat exchange and two thermal gradients arise in the heat transfer element.

It is furthermore preferred for the heat transfer element to be fed through the fluid line and to have a functional surface on each of the two sides of the fluid line.

As a result, the technical effort for producing the heat transfer elements can be reduced since merely one heat transfer element has to be manufactured, which element projects out of the fluid line on both sides of the fluid line.

It is furthermore preferred for a plurality of heat transfer elements which are in contact with one another to be arranged in the intermediate space, wherein longitudinal axes of the heat transfer elements are arranged inclined to one another. In other words, the heat transfer elements form a kind of grid or mesh in order to absorb the solar radiation and emit it to the heat transport medium.

As a result, the heat exchange through the functional surface can be improved since the individual heat transport elements are in contact with one another and the functional surfaces are enlarged and distributed more regularly in the building module.

It is furthermore preferred for the thermal contact to extend into the fluid line and to form convective heat transfer to the heat transport medium.

It is furthermore preferred for the heat transfer element to be releasably connectable to the fluid line in at least one axial end section.

As a result, the transport effort for the building module can be reduced considerably since the heat transfer elements can be transported in a disassembled state.

It is furthermore preferred for the fluid line to have at least one guide strip extending in a longitudinal direction of the fluid line, the at least one axial end section of the heat transfer element being introducible into said guide strip.

As a result, the heat transfer element can be fixed to the fluid line with little assembly effort.

It is furthermore preferred for the axial end section to be mounted so as to be movable in the longitudinal direction of the fluid line.

As a result, a precise installation position of the heat transfer element can be set on site with little assembly effort.

It is furthermore preferred for the at least one axial end section to be introducible into the guide strip via an introduction opening in an axial end section.

As a result, the heat transfer element can be plugged in easily in the axial end section of the guide strip and be moved in the longitudinal direction of the guide strip into an end position, with the result that the assembly effort is further reduced. As a result, it is furthermore possible for a plurality of heat transfer elements to be introduced into the guide rail in the same way, with the result that the assembly effort for the heat transfer elements is further reduced.

It is furthermore preferred for a plurality of heat transfer elements to be mounted in the guide strip and to be spaced apart by means of spacer elements which are mounted in the guide strip.

As a result, the assembly effort and the technical effort for exact positioning of the heat transfer elements in the guide rail is further reduced since the heat transfer elements and the spacer elements have to be plugged into the guide strip from the axial end section merely in an alternate manner.

As a result, the heat transfer between the absorber element and the heat transport medium can be improved since an area of the thermal contact around which the heat transport medium flows is increased.

It is furthermore preferred for the inner pane and the outer pane to be connected together by means of a connecting element which forms a frame of the building module, wherein the fluid line is integrated into the frame at least on one side of the solar energy module.

As a result, a particularly compact structural form of the building module can be achieved, wherein the fluid line is integrated in the frame so as not to be visible from the outside.

It is furthermore preferred for the outer pane to be formed from a material that is transparent to visible light and for the surface of the inner pane which faces the intermediate space to have an infrared reflection layer in order to reflect the incoming infrared rays into the intermediate space.

As a result, the efficiency of infrared absorption can be increased since infrared radiation which is not absorbed by the functional surface or does not strike the functional surface when the solar rays are incident is reflected by the infrared reflection layer and can be absorbed for example by a rear side of the heat transfer elements. As a result, an efficiency-increasing heat accumulation can be formed in the intermediate space.

In a preferred embodiment, an infrared reflection layer is arranged on a surface of the outer pane which faces the intermediate space in order to reflect infrared rays into the intermediate space.

As a result, infrared rays which are reflected out of the intermediate space or by the surface of the inner pane can be reflected back into the intermediate space, with the result that the efficiency of infrared absorption can be increased.

It is furthermore preferred for the fluid line to be assigned a heat accumulator in order to take up and store heat from the heat transport medium and to emit stored heat to the heat transport medium. Alternatively or in combination with the heat accumulator, a heat pump can be provided in order to utilize the thermal energy and to convert it for example into electrical energy.

As a result, thermal energy can be stored during solar irradiation and, at a later time when solar irradiation is reduced on account of the weather or time of day, the heat is returned to the heat transport medium in order to utilize the thermal energy in a demand-oriented manner.

It is furthermore preferred for the fluid line to be connected to a heat pump in order to dissipate heat from the heat transport medium and/or supply heat to the transport medium.

As a result, it is also possible to dissipate small quantities of heat from the heat transport medium or for the heat transport medium to be heated by small quantities of heat.

It is furthermore preferred for a cross-sectional area of the heat transfer element to have a smaller diameter than a cross-sectional area of the fluid line.

It is furthermore preferred for the heat transfer element to have an elongate module body with a polygonal cross section on which a plurality of functional surfaces are formed.

As a result, for example different functional surfaces can be utilized in a demand-oriented manner for different functions. In particular, the different functional surfaces can be oriented in this case in a demand-oriented manner in order to utilize the incident solar rays differently.

It is particularly preferred in this case for a photovoltaic unit to be arranged on at least one of the functional surfaces.

As a result, the incident solar rays can be converted into electrical energy and thus the efficiency of the building module can be enhanced.

It is furthermore preferred in this case for at least one of the functional surfaces to have a reflective surface.

As a result, the incident solar rays can be deflected into an interior of a building or be reflected outward by the solar energy module in order either to accordingly illuminate the interior of the building or to reduce the solar irradiation.

It is generally preferred for the heat transfer element to be configured as a solid body. In this case, the expression "solid body" should be understood as meaning that no cavities are formed in the heat transfer element.

As a result, the heat transfer by heat conduction within the heat transfer element can be improved and thus the exchange of heat between the functional surface and the heat transport medium can be increased.

In the method according to the invention, it is particularly preferred for an axial end of the heat transfer element to be connected to a guide rail of the guide strip.

As a result, the assembly effort and the effort for positioning the heat transfer elements can be reduced.

It is furthermore preferred for the axial end of the heat transfer element to be introduced into the guide strip at an axial end of the guide strip.

As a result, the heat transfer element can be assembled on the axial end section of the guide strip by simply being plugged in, without further holding mechanisms needing to be provided.

It is furthermore preferred for a plurality of heat transfer elements and a plurality of spacer elements to be introduced alternately into the guide strip in order to space apart the heat transfer elements in an installed state.

As a result, the assembly effort and the positioning effort for the heat transfer elements can be further reduced since the heat transfer elements and the spacer elements merely have to be plugged alternately into the introduction opening in the guide strip.

By way of the present invention, a building module having a heat transfer element which is arranged between the inner pane and the outer pane can be provided overall in a compact structural form, with the result that overall the production effort is reduced and at the same time the view through the building module is improved. This is achieved according to the invention in that the heat transfer element merely exchanges heat between the functional surface and the thermal contact arranged on an end section of the heat transfer element by means of heat conduction and thus the heat transfer element merely has to be formed from a stable and thermally conductive material. The fluid line in which the heat transport medium is conducted is in this case formed separately from the functional surface and is connected to the end section or to two opposite axial end sections of the heat transfer element merely via the thermal contact. As a result, it is possible to omit a complicated fluid line in the heat transfer element, with the result that the heat transfer element is less technically complicated and at the same time can be manufactured in a compact structural form. In an alternative embodiment or in a particular embodiment, the thermal contact and the functional surface are arranged juxtaposed to one another when the functional surface is viewed in a perpendicular direction. In other words, the thermal contact and the functional surface do not overlap when the functional surface is viewed in a perpendicular direction.

Furthermore, according to the second aspect of the present invention, a flow of heat through the solar energy module can be reduced when heat is transferred from the heat transport medium to the functional surface and from the functional surface to the gaseous medium in order to set a temperature of the gaseous medium in the intermediate space. As a result, the flow of heat through the inner pane can be regulated, with the result that in particular the insulation action of the entire building module can be improved.

It goes without saying that the features and properties of the building module according to the invention also apply or are applicable in a corresponding manner to the method according to the invention for producing the building module.

It goes without saying that the abovementioned features and those yet to be explained below are usable not only in the combination given in each case but also in other combinations or on their own without departing from the scope of the present invention.

BRIEF DESCRIPTION OF THE DRAWINGS

Exemplary embodiments of the invention are represented in the drawings and are explained in more detail in the following description. In the drawings:

FIG. 4 shows a schematic view of the building module and of an associated fluid system for explaining the operation of the building module;

FIG. 7 shows a schematic partial view for explaining an alternative embodiment of the thermal contact between the heat transfer elements and the heat transport medium;

FIG. 8b shows a schematic side view of the building module from FIG. 8a;

FIG. 9 shows a schematic sectional side view of the building module having heat transfer elements which have a plurality of functional surfaces and a polygonal cross-sectional area;

DESCRIPTION OF PREFERRED EMBODIMENTS

Figure 1:
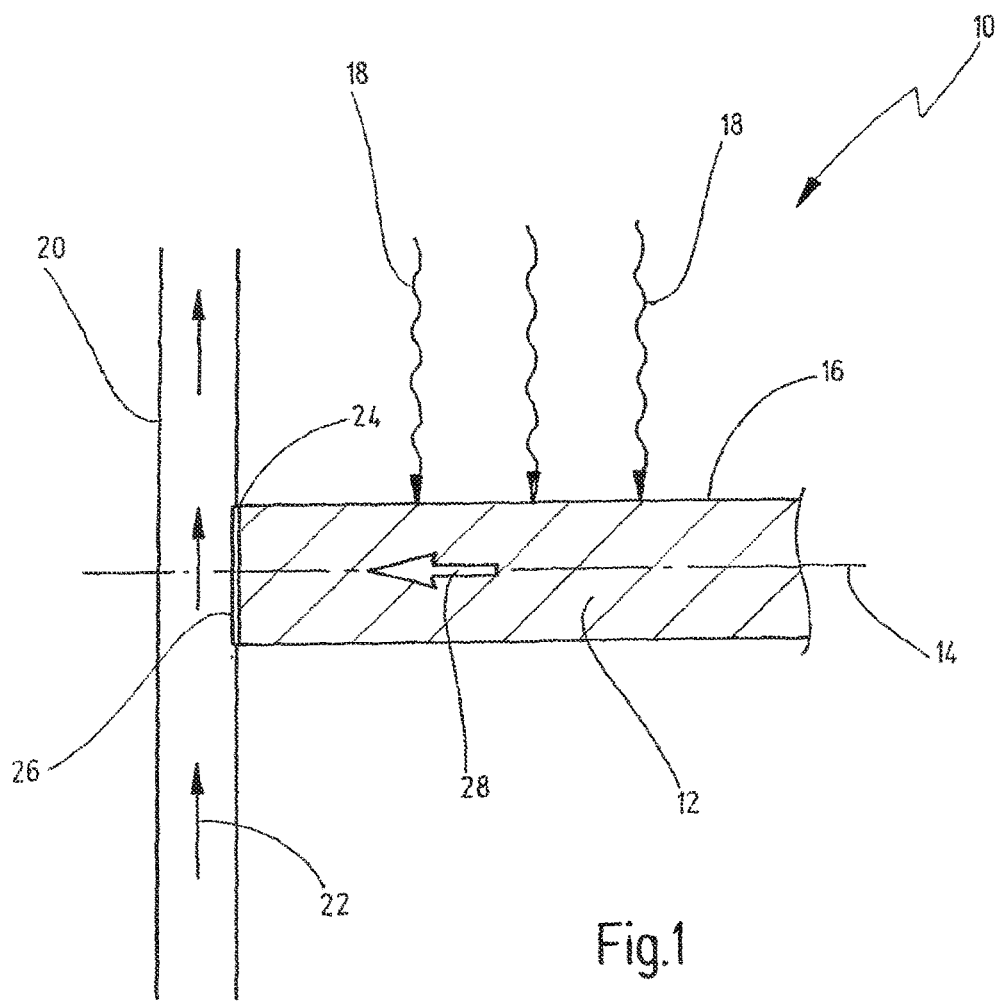
FIG. 1 shows a schematic partial view of a building module for utilizing solar energy.

FIG. 1 illustrates a schematic partial view of a building module which has the overall designation 10. The building module 10 has an inner pane (not illustrated here) and an outer pane (not illustrated here) arranged parallel thereto, said outer pane extending parallel to the plane of the drawing in FIG. 1 and being explained in more detail in the following text. Such building modules 10 serve to clad a building, for example as a facade module, roof module or window module and can be in the form of a solar energy module 10 and/or of an insulation module 10.

The building module 10 has a heat transfer element 12, or an absorber element 12, which is in the form of an elongate element and has a longitudinal axis 14. On an outer surface, the absorber element 12 has a functional surface 16 which is configured to absorb solar rays 18. The functional surface 16 is in thermal contact with the absorber element 12 so that the solar rays 18 absorbed by the functional surface 16 heat the absorber element 12.

The building module 10 furthermore has a fluid line 20 in which a heat transport medium 22 is conducted. The fluid line 20 and the functional surface 16 are arranged juxtaposed to one another when the functional surface 16 is seen in a perpendicular direction, or in a perpendicular projection of the functional surface 16.

The absorber element 12 is in thermal contact with the heat transport medium 22 at an axial end 24 by means of a thermal contact 26, in order to exchange heat between the absorber element 12 and the heat transport medium 22. In this case, the section of the fluid line 20 on which the thermal contact 26 is formed is arranged juxtaposed to the functional surface 16 when the functional surface 16 is viewed in a perpendicular direction. Furthermore, the absorber element 12 is mounted on the fluid line 20 at the axial end 24.

The absorber element 12 is in the form of a heat conductor such that heat, which is generated in the functional surface 16 or in the absorber element 12 by the incident solar radiation, is transported by heat conduction to the thermal contact 26 and is emitted via convection to the heat transport medium 22 by means of the thermal contact 26. Since the thermal contact 26 is formed at the axial end 24 of the absorber element 12 and the functional surface 16 is formed along the length of the absorber element 12, a flow of heat 28 is produced by heat conduction in the absorber element 12, said flow of heat running in the axial direction of the absorber element 12 or parallel to the longitudinal axis 14.

In other words, the thermal contact 26 and the functional surface 16 are arranged juxtaposed to one another or in a manner offset with respect to one another in the axial direction of the absorber element 12, or the functional surface 16 and the fluid line 20 are arranged partially or completely juxtaposed to one another or in a manner offset with respect to one another when the functional surface 16 is viewed in a perpendicular direction. Put another way, the thermal contact 26 is formed merely on a lateral end section when the functional surface 16 is viewed in a perpendicular direction.

The absorber element 12 is preferably in the form of a solid body, i.e. the absorber element 12 preferably does not have any cavities, in order to allow heat conduction that is as good as possible in the axial direction. The absorber element 12 is formed from a material with good heat conductivity, for example from a metal such as copper or aluminum. The heat transport medium 22 is guided past the thermal contact 26 orthogonally to the longitudinal axis 14 in order to allow heat exchange between the heat transport medium 22 and the thermal contact 26.

Since heat transport takes place between the functional surface 16 and the thermal contact 26 by heat conduction, the absorber element 12 can be manufactured in a particularly compact structural form and with little technical effort and be arranged between the inner pane and the outer pane of a window so that the view through the panes is impaired only a little. The heat transport medium 22 heated in this way can be utilized for example to heat an interior of a building, or the heat can be stored in order to heat the absorber element 12 in the event of relatively low solar irradiation 18, as is explained in more detail below.

The heat transfer element 12, or the absorber element 12, can have any desired form, in particular a round, square or rectangular base area. As an alternative to the elongate form described here, the heat transfer element 12 can also be in the form of a plate which is in contact with the fluid line 20 at a lateral edge by means of the thermal contact 26 and at the same time is mechanically mounted on the fluid line 20. In this case, the fluid line 20 and the functional surface 16 are arranged juxtaposed to one another or in a manner laterally offset with respect to one another in a perpendicular projection of the functional surface 16.

In a preferred embodiment, the functional surface 16 is blackened or anodized in order to improve the heat transfer to the functional surface 16.

Figure 2:
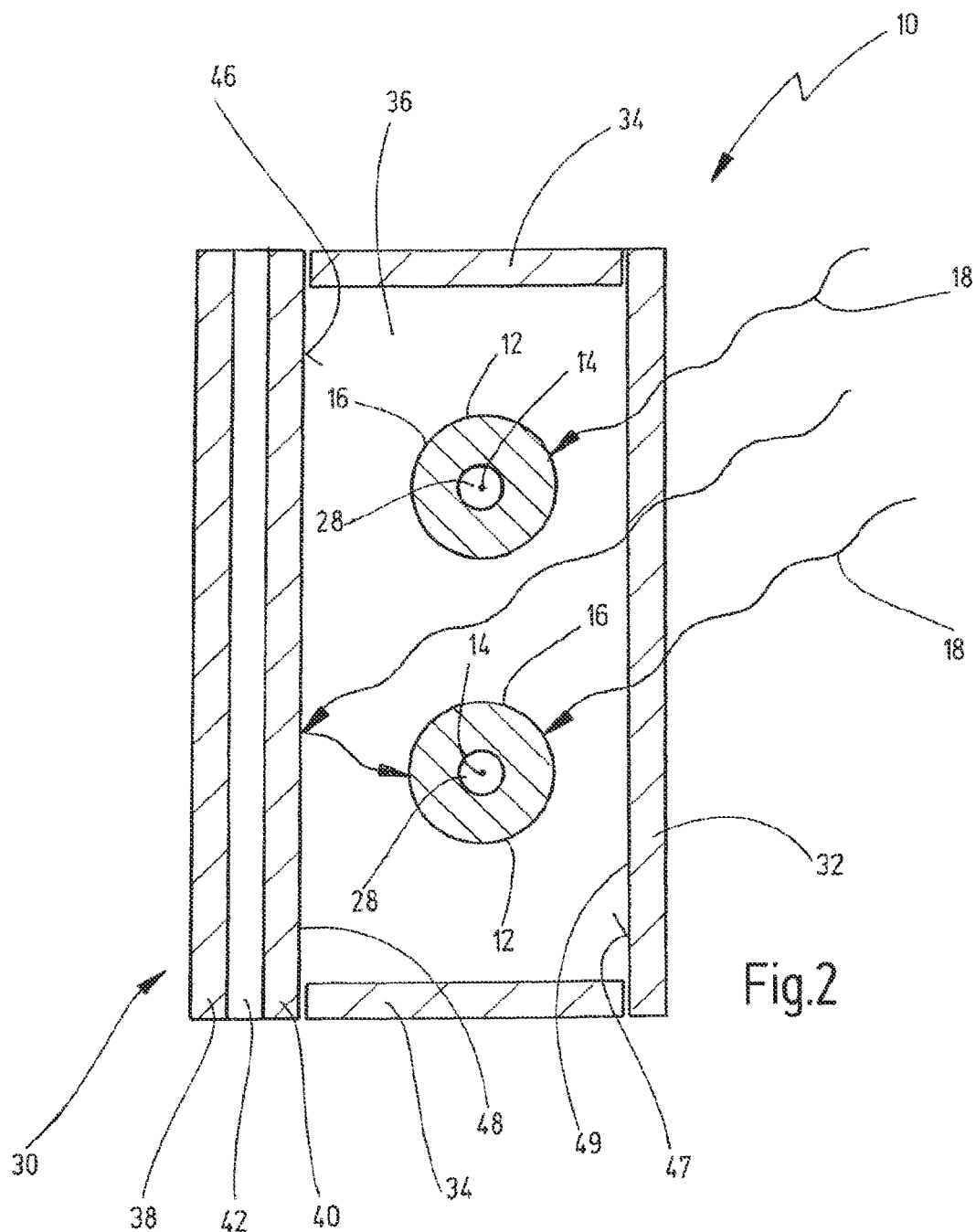
FIG. 2 shows a schematic sectional side view of the building module from FIG. 1.

FIG. 2 shows the building module 10 from FIG. 1 in a schematic sectional side view. Identical elements are designated by the same reference numerals, with only particular features being explained here.

The building module 10 has an inner pane 30 and an outer pane 32, which are arranged parallel to one another and are connected together by means of connecting elements 34. Formed between the inner pane 30 and the outer pane 32 is an intermediate space 36, in which the absorber elements 12 are arranged.

The longitudinal axes 14 of the absorber elements 12 extend substantially parallel to the inner pane 30 and the outer pane 32 and perpendicular to the plane of the drawing in the illustration in FIG. 2.

The inner pane 30 is in the form of an insulating glass pane and has two separate panes 38, 40 which are separated from one another by a vacuum 42 or a gas filling. Alternatively, the pane 30 can also be in the form of a single pane.

Arranged on a surface 46, facing the intermediate space 36, of the inner pane 30 is an infrared reflection layer 48 in order to reflect infrared radiation or other wavelengths of the incident solar rays 18 into the intermediate space 36 or onto the functional surfaces 16 of the absorber elements 12. Arranged on a surface 47, facing the intermediate space 36, of the outer pane 32 is an infrared reflection layer 49 in order to reflect reflected infrared radiation or other wavelengths into the intermediate space 36. The reflection layers 48, 49 are configured so as to be transparent for visible light.

The outer pane 32 is formed in a transparent manner in order to transmit the solar rays 18 into the intermediate space 36 such that the solar rays 18 striking the functional surface 16 can heat the absorber elements 12. Infrared radiation of the solar rays 18 which strike the inner pane 30 through the intermediate space 36 are reflected by the infrared reflection layer 48 and reflected at least partially onto the functional surfaces 16 of the absorber elements 12. The infrared rays reflected in this way can be reflected by the second infrared reflection layer 49 in the intermediate space 36 in order in this way to generate a heat accumulation. As a result, the efficiency of the utilization of the incident solar rays 18 can be increased.

The building module 10 is preferably arranged on buildings and serves as a facade module, roof module or window module in order to accordingly utilize the incident solar energy. In this case, the inner pane 30 faces an outer wall of the building or an interior of the building and the outer pane 32 faces a surrounding area of the building. It is possible for the inner pane 30 to be formed in a nontransparent manner when used as a facade module or to be formed in a transparent manner when used as a window module.

Figure 3:
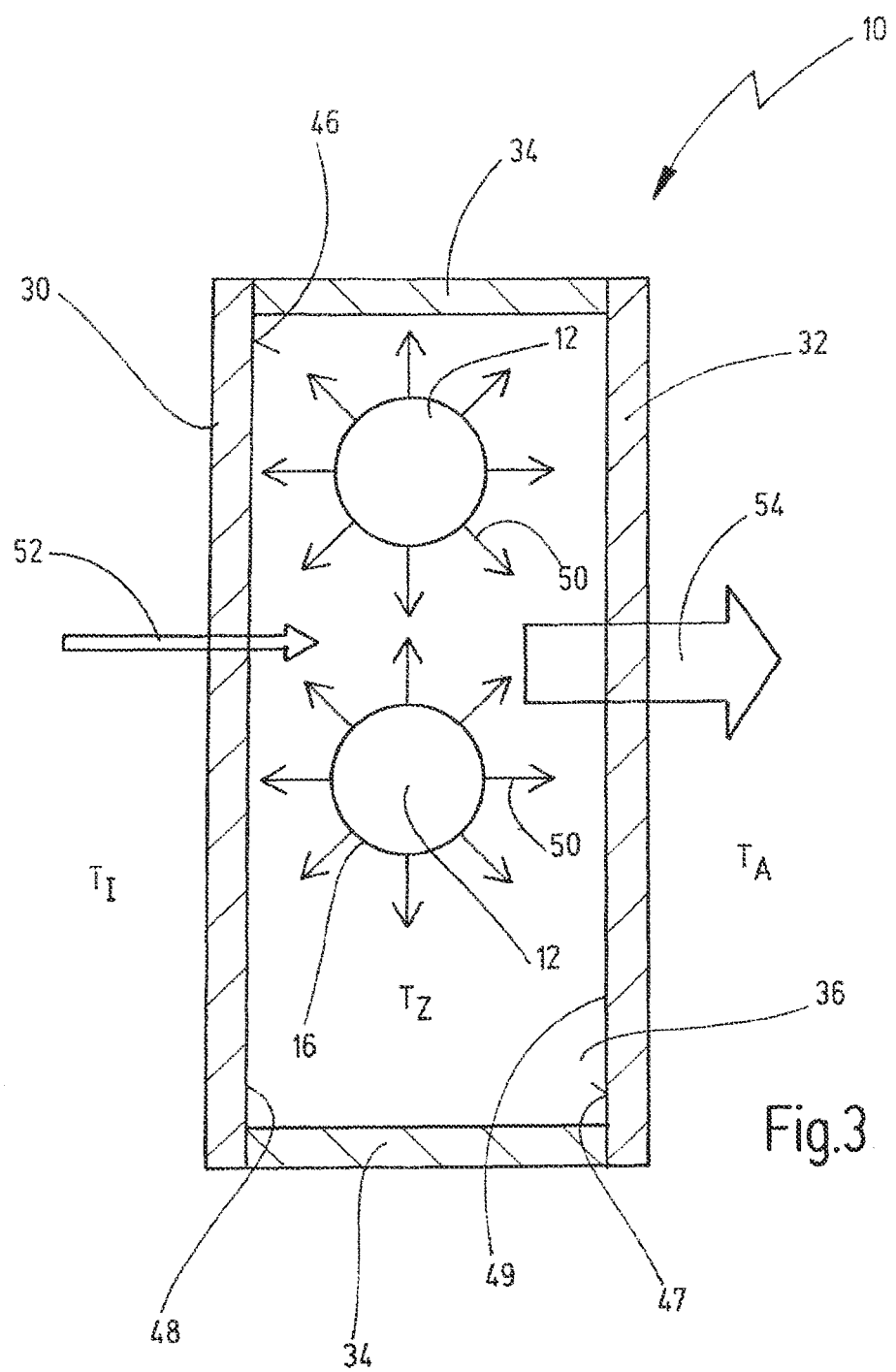
FIG. 3 shows a schematic sectional side view of a building module for regulating the flow of heat.

FIG. 3 shows a schematic sectional side view of the building module 10. Identical elements are designated by identical reference numerals, with only particular features being explained here.

In the function illustrated in FIG. 3, the building module 10 serves for insulating an interior or the building generally from an external area, wherein the interior or in the internal area has an internal temperature TI and the external area has an external temperature TA. In the situation illustrated here, the external temperature TA is lower than the internal temperature TI and so, under normal circumstances, for example when a normal insulating glass pane or normal insulation is used, a flow of heat from inside to outside would form.

In the embodiment illustrated here, the intermediate space 36 is closed off in a gastight manner by the inner pane 30, the outer pane 32 and the connecting elements 34, and filled with a gaseous medium, for example an inert gas such as argon. In the situation illustrated in FIG. 3, thermal energy is transferred from the heat transport medium 22 via the thermal contact 26 to the heat transfer elements 12, such that heat is emitted to the gaseous medium via the functional surfaces 16, as is indicated by arrows 50. As a result, an intermediate-space temperature TZ of the gaseous medium in the intermediate space 36 is increased and adapted to the internal temperature TI. As a result, a temperature gradient between the internal area and the intermediate space 36 can be reduced, such that an inner heat flow 52 that arises on account of the temperature gradient through the inner pane 30 is reduced. Furthermore, an outer heat flow 54 through the outer pane 32 arises in accordance with the temperature gradient between the intermediate-space temperature TZ and the external temperature TA. As a result of the intermediate-space temperature TZ being adapted or raised to the internal temperature TI, the inner heat flow 52 can be reduced very greatly, with the result that the heat loss from the interior can be reduced very greatly, or the interior can be insulated very well from the external area.

In this process, thermal energy that was generated by the solar rays 18 and was buffer-stored for example in a heat accumulator is preferably used in the heat transport medium 22. As a result, solar energy can be used and buffer-stored and utilized for insulating the interior from the external area. In one particular embodiment, the heat transport medium 22 can also be heated by an additional energy source in order to accordingly raise the intermediate-space temperature TZ and thus to achieve improved insulation of the interior from the external area.

In a similar manner, the gaseous medium can also be cooled by the heat transfer elements 12, or heat can be transferred from the gaseous medium to the heat transport medium 22 by the heat transfer elements 12 in order to cool the gaseous medium and thus the intermediate space 36. As a result, the inner heat flow 52 can be increased, with the result that the internal temperature TI can be reduced and thus the interior can be cooled or air-conditioned. In this process, the heat transport medium 22 can be cooled for example by a cooling system.

FIG. 4 schematically illustrates the building module 10 with a fluid system. Identical elements are designated by identical reference numerals, with only the particular features being explained here.

The building module 10 has three of the heat transfer elements 12, which are arranged between the inner pane 30 and the outer pane 32 and extend over the entire width of the building module 10. The building module 10 forms a building window in the embodiment illustrated in FIG. 4.

The building module 10 has a frame 60 which mounts the inner pane 30 and the outer pane 32. Arranged in the frame 60 is the fluid line 20, in which the heat transport medium 22 is conducted, said heat transport medium 22 being in thermal contact with the three heat transfer elements 12. The heat transport medium 22 is thermally connected to in each case one of the heat transfer elements 12 in each case by one of the thermal contacts 26. The fluid line 20 is thermally separated from the panes 30, 32 by means of a spacer, in order to improve thermal insulation and to reduce mechanical stresses.

The fluid line 20 is part of a fluid system which has the overall designation 62 in FIG. 4. The fluid system 62 has a fluid circuit and a heat exchanger 64 in order to circulate the heat transport medium 22 and accordingly dissipate heat from the heat transfer elements 12 or supply heat to the heat transfer elements 12. The heat exchanger 64 exchanges heat with a thermal system (not illustrated here), for example an interior heating system for heating the interior of the building, a heat accumulator for storing the thermal energy absorbed by the heat transfer elements 12, or a heat pump for dissipating or supplying thermal energy. The heat exchanger 64 has a pump (not illustrated in more detail here), in order to pump the heat transport medium 22 around in the fluid system 62. The heat exchange between the heat exchanger 64 and the heat transfer elements 12 preferably takes place in this case via setting of a mass flow of the heat transport medium 22 in the fluid line 20. Arranged in the intermediate space 36 is a temperature sensor, and on the basis of the intermediate-space temperature TZ measured in this way, the mass flow or the pump output is set.

In this way, thermal energy can be dissipated from the heat transfer elements 12 using simple means in order to accordingly utilize the thermal energy, or thermal energy can be supplied to the heat transfer elements 12 in order to heat the intermediate space 36 and thus to reduce the inner heat flow 52, or the intermediate space 36 can be cooled by removal of heat. In a particular embodiment, the thermal energy can also be utilized to cool the interiors, for example by means of a heat pump.

In one particular embodiment, a number of the housing modules 10 are connected via the fluid system 62 and/or the heat exchanger in order to exchange thermal energy between the building modules 10. In this case, for example solar energy can be transferred from building modules 10 that are irradiated to modules 10 that are not irradiated, for example modules 10 facing away from the sun, in order to reduce the inner heat flow 52 there and to insulate the building.

In FIG. 4, the fluid line 20 is formed on one side in the frame 60. It goes without saying that the fluid line 20 can also be formed on a number of or all sides of the frame 60. Furthermore, different fluid lines 20 which are assigned to different fluid systems 62 can be formed in the frame 60.

Figure 5A:
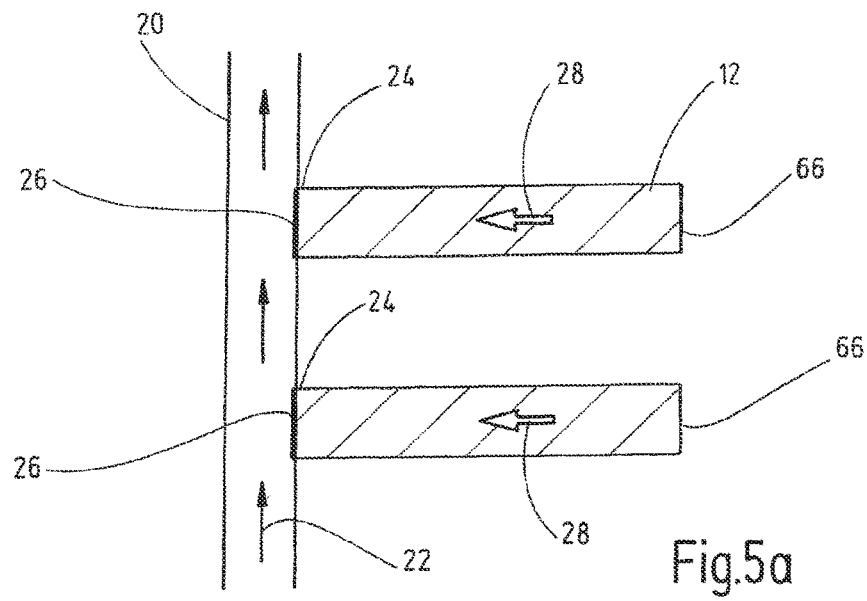
FIG. 5a shows a schematic view of an embodiment of the heat transfer elements having a free axial end.

FIG. 5a schematically illustrates an embodiment of the heat transfer elements 12, or of the absorber elements 12. In this case, the heat transfer elements 12 each have the axial end 24 on which the thermal contact 26 is formed, in order to exchange heat between the heat transfer elements 12 and the heat transport medium 22. The heat transfer elements 12 furthermore each have a free end 66 which is opposite the axial end 24. As a result, solar energy can be absorbed by the functional surface 16 or heat can be emitted from the functional surface 16 to the intermediate space 36, wherein at the same time a central section of a window formed in such a way remains free, thereby allowing an improved view through the window. The thermal contact 26 is formed merely at the axial end 24. Thus, in the heat transfer element 12 in FIG. 5a, the heat transport 28 is formed by heat conduction merely in an axial direction.

Figure 5B:
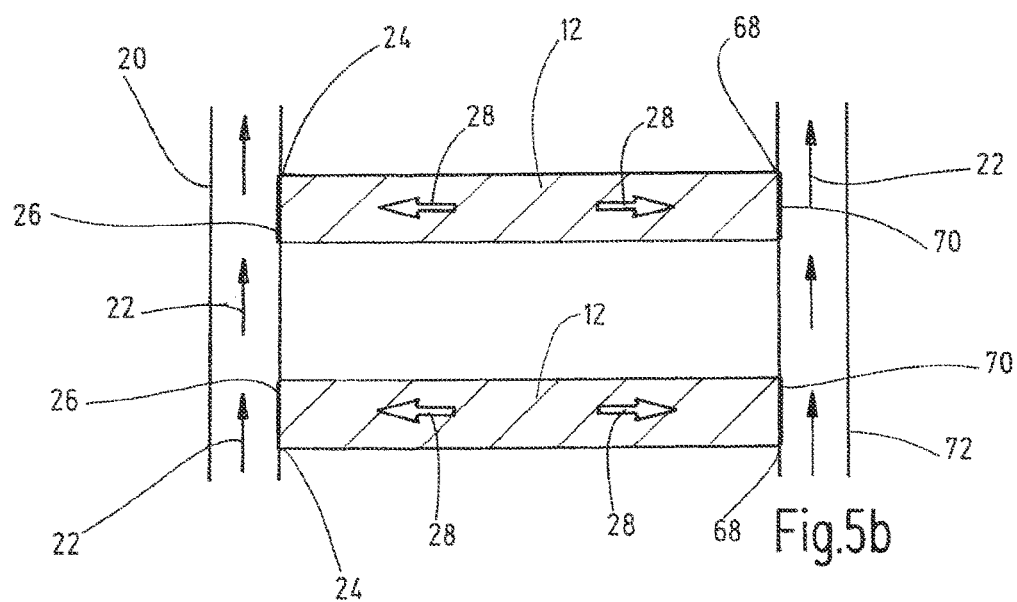
FIG. 5b shows a schematic view of an embodiment of the heat transfer elements having two-sided thermal contact.

FIG. 5b illustrates an alternative embodiment of the heat transfer elements 12, or of the absorber elements 12. In this case, the heat transfer elements have the thermal contact 26 at the axial end 24 for exchanging heat energy with the heat transport medium 22. Furthermore, the heat transfer elements 12 each have a further thermal contact 70 at the end 68 opposite the axial end 24, said further thermal contact 70 preferably being identical to the thermal contact 26. The thermal contact 70 is assigned to a further fluid line 72, which can be connected to the first fluid line 20.

The thermal contacts 26, 70 are formed merely at the axial ends 24, 68. As a result, in each case two heat flows 28 are formed by heat conduction in the heat transfer elements 12, said heat flows 28 being oriented in opposite directions toward the thermal contacts 26, 70.

In a section between the thermal contacts 26, 70, the heat transfer elements 12 can have a compensation element for compensating for thermal expansion.

In a particular embodiment, the thermal contact 26 is formed on an axial section of the heat transfer element 12, said axial section being formed in the axial direction between two functional surfaces 16.

Figure 6:
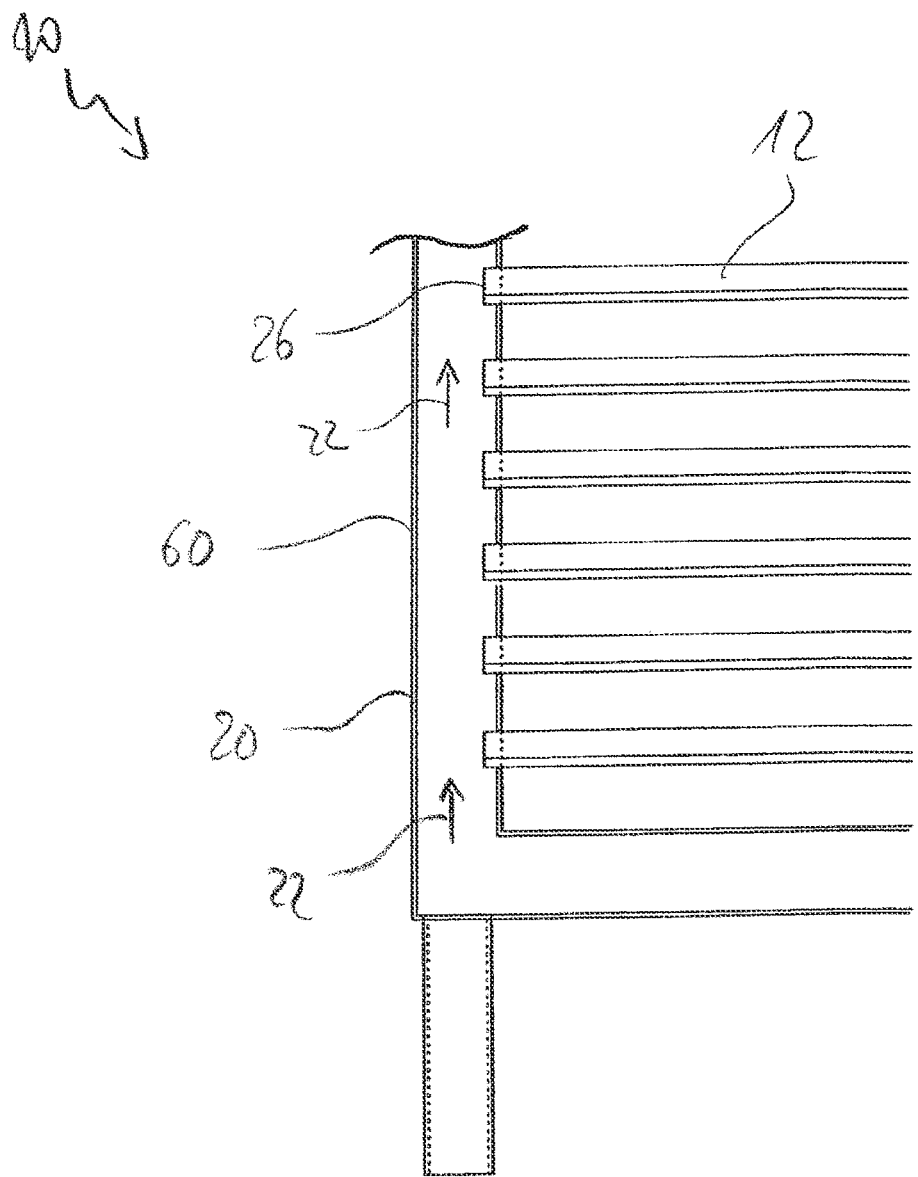
FIG. 6 shows a schematic partial view of the building module for explaining an embodiment of the thermal contact between the heat transfer element and heat transport medium.

FIG. 6 illustrates a schematic partial view of a building module 10 having the frame 60 in order to explain the thermal contact 26. In the embodiment illustrated in FIG. 6, the heat transfer elements 12 project into the fluid line 20 such that an enlarged surface area is formed as the thermal contact 26. As a result, the heat transfer between the heat transfer element 12 and the heat transport medium 22 can be improved.

In this embodiment, the thermal contacts 26 can be formed with a ribbed structure in order to enlarge a surface area of the thermal contact 26 and thereby to improve the heat transfer.

FIG. 7 schematically illustrates an alternative embodiment of the thermal contact 26.

The heat transfer elements 12 are in this case connected externally to the fluid line 20 so that the heat is transferred from the heat transfer element 12 to the fluid line 20 and from the fluid line 20 to the heat transport medium 22. In this case, the outer wall of the fluid line 20 and a contact surface between the heat transfer element 12 and the fluid line 20 forms the thermal contact 26. The advantage of this embodiment of the thermal contact 26 is that the fluid line 20 can be sealed off with less technical effort and the contact can be made with the absorber elements 12 with little effort. For example, the heat transfer elements 12 can be welded to the fluid line 20 in this embodiment.

In one particular embodiment, the fluid line 20 can have indentations into which the end sections 24 of the heat transfer elements 12 are introduced and form the thermal contact 26 with the fluid line 20. As a result, it is possible to omit complicated sealing of the fluid line 20.

In one particular embodiment, the thermal contact 26 is formed in an elastic manner, for example by a thermal paste or a resilient contact in order to compensate the thermal expansion of the heat transfer elements 12. In a further embodiment, the fluid lines 20 are mounted in a movable manner in order to compensate the thermal expansion of the heat transfer elements 12.

Figure 8A:
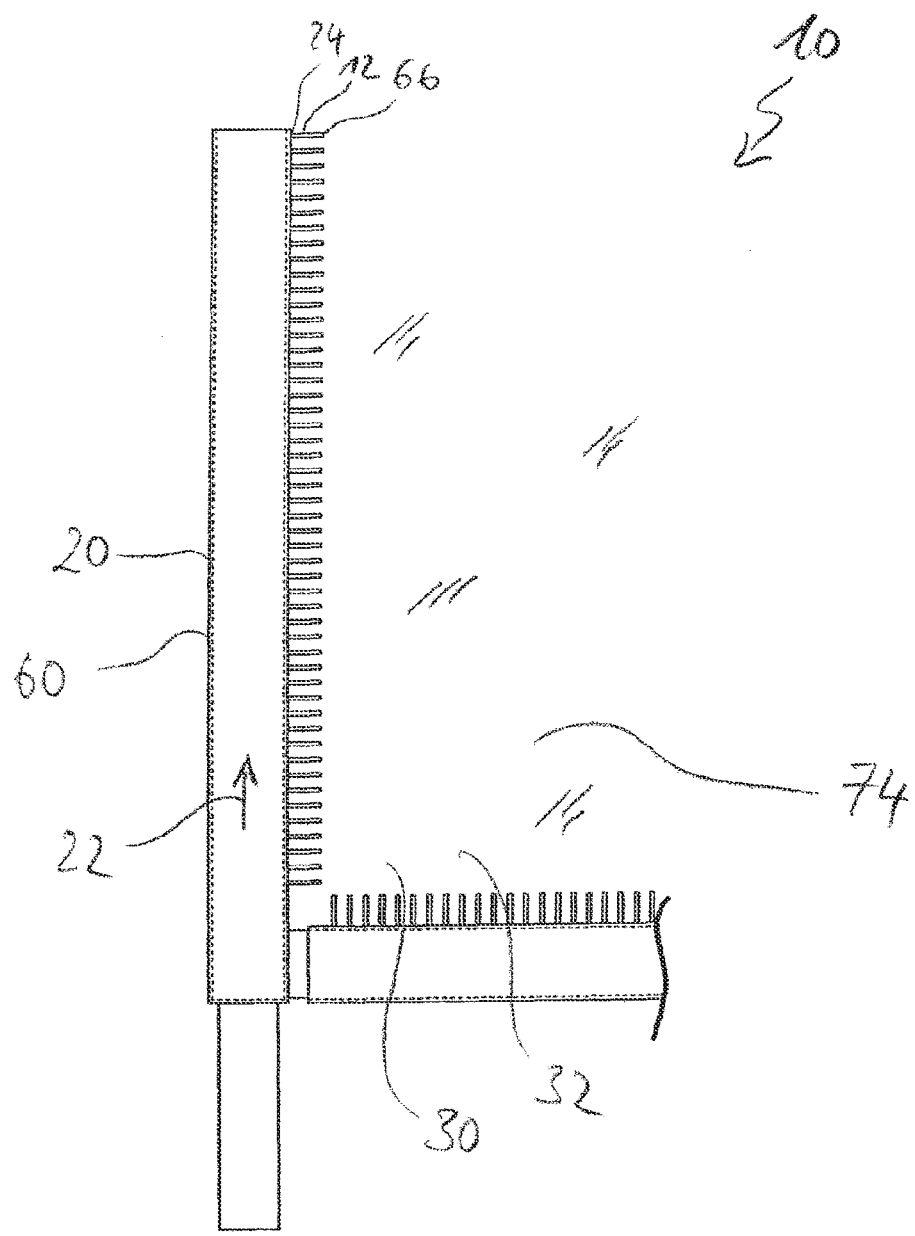
FIG. 8a shows a schematic partial view of the building module having heat transfer elements which have a free axial end.

FIG. 8a illustrates a schematic partial view of the building module 10 having heat transfer elements 12, or absorber elements 12, from the embodiment in FIG. 5a. In this case, the heat transfer elements 12 are in thermal contact with the fluid line 20 by means of the respective end 24. The respective free end 66 projects into the intermediate space 36 such that an internal area 74 of the solar energy module 10 remains free and allows a slightly restricted view through the panes 30, 32.

In this embodiment, the heat transfer elements 12 are formed both on a vertical side of the frame 60 and on a horizontal side of the frame 60. As a result, the efficiency of the building module 10 can be increased.

In a further embodiment, the absorber elements 12 can also be arranged inclined or obliquely with respect to one another and be connected together such that a grid or a mesh of heat transfer elements 12 is formed.

Figure 8B:
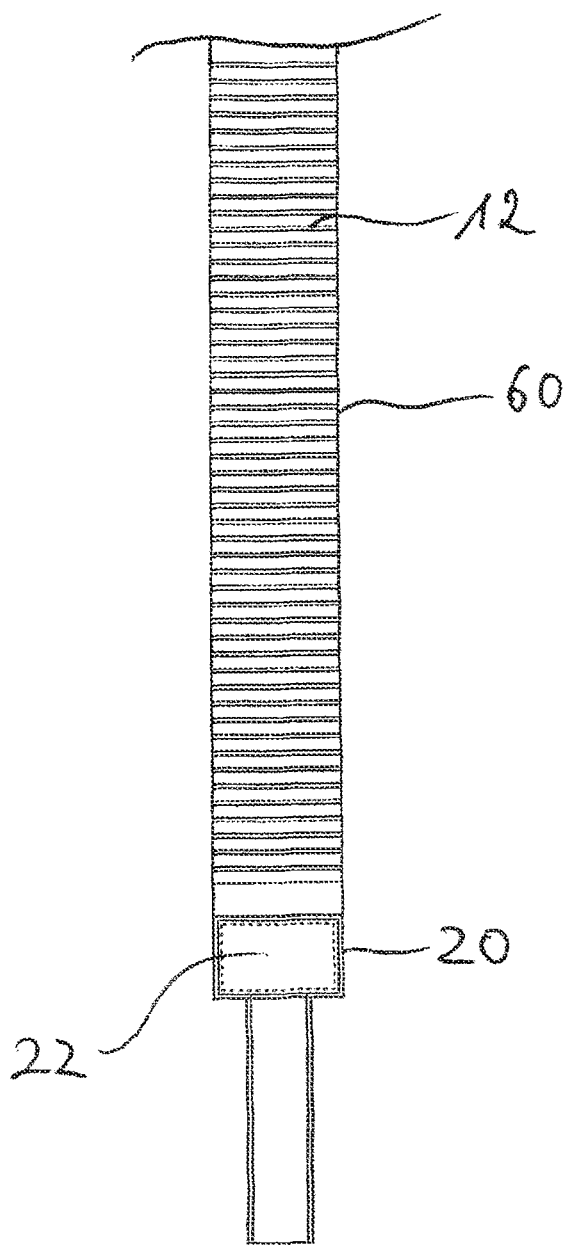

FIG. 8b illustrates a side view of the frame 60 of the building module 10 from FIG. 8a. Identical elements are designated by identical reference numerals, with merely the particular features being explained here.

The base area of the heat transfer elements 12, or of the absorber elements 12, is formed in an elongate or rectangular manner in this embodiment, such that the heat transfer elements 12 are in the form of horizontally arranged plates. Alternatively, these plate-like heat transfer elements 12 can also be arranged perpendicularly or parallel to a longitudinal axis of the respective frame element or the associated fluid line 20.

FIG. 9 illustrates a particular embodiment of the building module 10 having absorber elements 12 which have a polygonal cross section. In this case, the cross section has a planar functional surface 76 and two curved functional surfaces 78, 80. The absorber elements 12 can in this case be mounted so as to be rotatable about the longitudinal axis 14 and can accordingly be oriented with respect to the solar rays 18. In this case, the straight functional surface 76 can be oriented such that the solar rays 18 strike the straight functional surface 76 orthogonally. In a preferred embodiment, a photovoltaic unit is arranged on the straight functional surface 76 in order to generate electrical energy by way of the incident solar radiation 18. The functional surfaces 78, 80 are formed so as to reflect and/or to absorb the incident solar rays 18, in order to illuminate the interior and/or to heat the heat transport medium 22. In a simplified variant, the absorber elements 12 can also be mounted in a fixed manner.

The functional surface 78 is in this case formed in a concave manner and the functional surface 80 is formed in a convex manner.

Figure 10A:
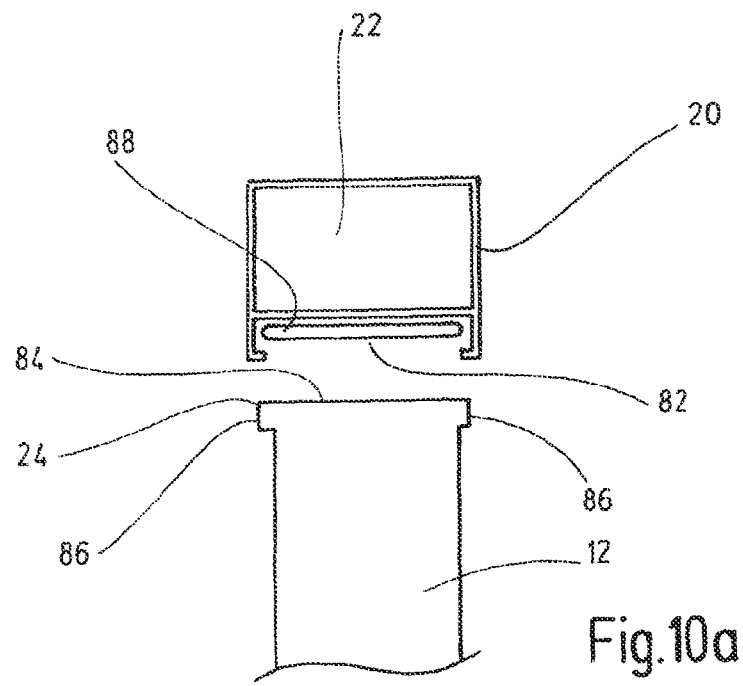
FIG. 10a, b show schematic sectional views of fluid lines having (a) guide strip(s) for connecting the heat transfer elements.

FIGS. 10a and b each illustrate schematic sectional illustrations of embodiments of the fluid line 20 and the heat transfer elements 12. Identical elements are designated by identical reference numerals, with merely the particular features being explained here.

The fluid line 20 in FIG. 10a has a guide strip 82 which extends in a longitudinal direction of the fluid line 20 on the outer side of the fluid line 20. The guide strip 82 has two opposite L-shaped guide sections. The guide strip 82 is configured to receive a connecting section 84, which is formed at the axial end 24 of the heat transfer element 12, and to accordingly mount and fix the heat transfer element 12 in a lateral direction transversely to the longitudinal direction of the fluid line 20. In the embodiment illustrated here, the guide section 84 has lateral protrusions 86 which engage behind the L-shaped guide sections or guide grooves of the guide strip 82 in order to mount the heat transfer element 12. In an alternative embodiment, the axial end 24 does not have lateral protrusions 86 and is formed in a substantially rectilinear manner, wherein, for axial guidance, the fluid line 20 serves as an axial stop.

Formed at an axial end of the fluid line 20, or of the guide strip 82, is an insertion opening into which the guide section 84 of the axial end 24 of the heat transfer element 12 is introduced into the guide strip 82 and is then moved in the axial direction in the guide strip 82 in order to assemble the heat transfer element 12.

Only one axial end 24 of the heat transfer element 10 is illustrated in FIG. 10a, for example for heat transfer elements 12 having an opposite free end 66. It goes without saying that the guide strip 82 and the guide section 84 can also be formed at opposite ends of the heat transfer element 12 in order to mount the heat transfer element 12 on both sides.

Figure 10B:
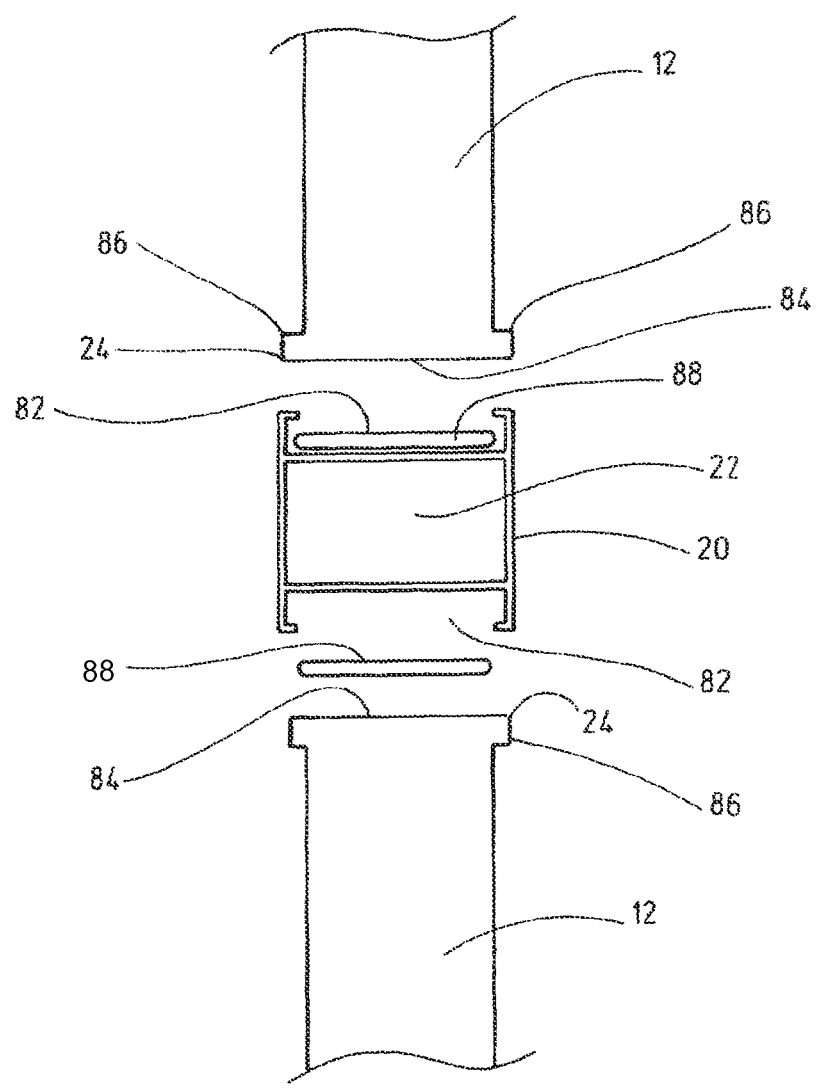

FIG. 10b schematically illustrates an alternative embodiment of the fluid line 20 having guide strips 82 on both sides. Identical elements are designated by identical reference numerals, with merely the particular features being explained here.

On opposite sides, the fluid line 20 has in each case one of the guide strips 82 in which two connecting sections 84 of two heat transfer elements 12 can accordingly engage in order to accordingly mount the heat transfer elements 12.

During assembly, the heat transfer elements 12 are accordingly guided through the introduction opening into the guide strip 82 and are spaced apart from one another by means of a spacer element, which is likewise introduced into the guide strip 82, and accordingly supported with respect to one another. As a result, the heat transfer elements 12 can be mounted in a fixed position and can be assembled with low technical effort. The thermal contact 26 is then formed by a separate thermal contact element 88 or by a thermally conductive paste 88.

Figure 11:
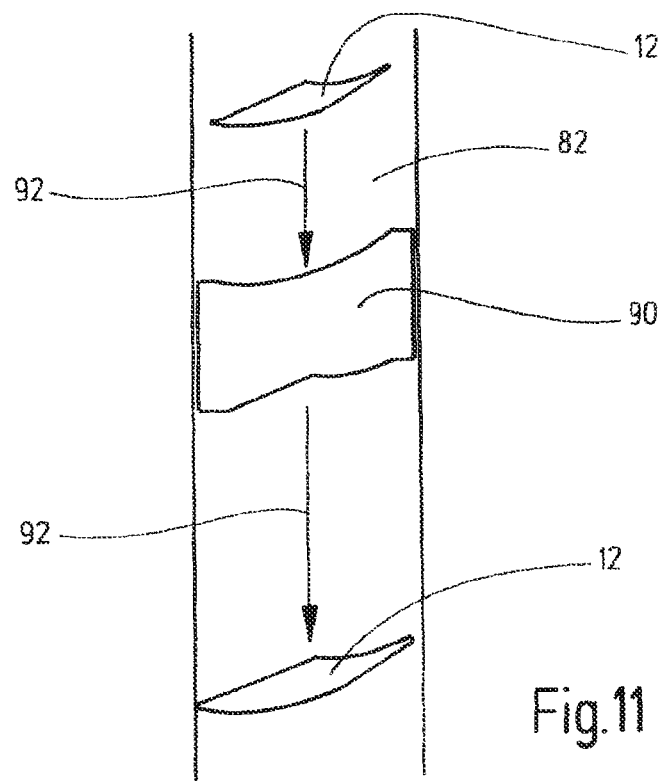
FIG. 11 shows a schematic side view for explaining the mounting of the heat transfer elements by means of spacer elements.

FIG. 11 illustrates a schematic side view of the guide strip 82. Identical elements are designated by identical reference numerals, with merely the particular features being explained here.

The heat transfer elements 12 and spacer elements 90 are introduced alternately into the guide strip 82, as is indicated by arrows 92, in order to accordingly space apart the heat transfer elements 12 and to support them with respect to one another. The spacer elements 90 in this case accordingly have an outer shape that is complementary to the heat transfer elements 12, such that the heat transfer elements 12 can accordingly be mounted in a play-free and fixed manner. As a result of the inherent weight of the heat transfer elements 12, the heat transfer elements 12 and the spacer elements 90 are pressed against one another, with the result that the thermal contact between the heat transfer elements 12 and the spacer elements 90 is improved.

As a result, simple assembly of the heat transfer elements 12 is possible by simple alternate plugging in of the heat transfer elements and spacer elements 90. In one particular embodiment, the heat transfer elements 12 and the spacer elements 90 are connected thermally together for example by means of a thermal conductive paste 88 and the spacer elements 90 are furthermore connected thermally to the fluid line 20 such that the heat transfer between the heat transfer element 12 and the fluid 22 in the fluid line 20 is improved.

The invention claimed is:

1. A building module in the form of a facade module, a roof module or a window module for utilizing solar energy and/or for thermal insulation, having:
   a frame;
   an inner pane and an outer pane that are mounted to the frame, wherein an intermediate space is formed between the inner pane and the outer pane;
   a heat transfer element that is mounted to the frame, that is arranged in the intermediate space, and that includes a solid body which extends along a longitudinal axis with at least one axial end section and at least one functional surface for absorbing thermal radiation and/or also for controlling the temperature of the intermediate space; and
   a fluid system including a fluid line that is mounted to the frame, that includes an outer wall in which a heat transport medium is circulated, and that is formed outside of the heat transfer element, wherein the heat transfer element and the fluid line are arranged so that the longitudinal axis of the solid body is perpendicular to the outer wall of the fluid line, so that the at least one axial end section of the solid body is externally connected to the outer wall of the fluid line without extending into the heat transport medium circulating within the fluid line, and so that a thermal contact is formed between the at least one axial end section of the solid body and the outer wall of the fluid line at a location within the frame thereby allowing an exchange of heat between the heat transfer element and the heat transport medium.

2. The building module as claimed in claim 1, wherein the intermediate space is formed in a gastight manner and is filled with a gaseous medium so that heat is exchangeable between the heat transport medium and the gaseous medium.

3. The building module as claimed in claim 1, wherein the heat transfer element is formed as an elongate element, wherein the thermal contact and the at least one functional surface are formed in a manner offset with respect to one another in an axial direction of the heat transfer element.

4. The building module as claimed in claim 1, wherein the thermal contact is formed on an end face of the heat transfer element.

5. The building module as claimed in claim 1, wherein the heat transfer element has a free end section at which at least a part of the at least one functional surface is formed.

6. The building module as claimed in claim 1, wherein the heat transfer element has a thermal contact at each of two opposite end sections, said thermal contacts each being assigned to a fluid line.

7. The building module as claimed in claim 1, wherein the building module has a plurality of elongated heat transfer elements, wherein longitudinal axes of the heat transfer elements are arranged inclined to one another and are connected thermally to one another.

8. The building module as claimed in claim 1, wherein the heat transfer element is releasably connectable to the fluid line at the at least one axial end section.

9. The building module as claimed in claim 1, wherein the fluid line has at least one guide strip extending in a longitudinal direction of the fluid line, the at least one axial end section of the heat transfer element being introducible into said guide strip.

10. The building module as claimed in claim 9, wherein the at least one axial end section is mounted so as to be movable in the longitudinal direction of the fluid line.

11. The building module as claimed in claim 9, wherein the at least one axial end section is introducible into the guide strip via an introduction opening in an axial end section.

12. The building module as claimed in claim 11, wherein a plurality of heat transfer elements are mounted in the guide strip and are spaced apart by means of spacer elements which are mounted in the guide strip.

13. The building module as claimed in claim 1, wherein the inner pane and the outer pane are connected together by means of a connecting element which forms part of the frame of the building module, wherein the fluid line is integrated into the frame at least on one side of the building module.

14. The building module as claimed in claim 1, wherein the outer pane is formed from a transparent material and wherein a surface of the inner pane which faces the intermediate space has an infrared reflection layer in order to reflect the incoming infrared rays into the intermediate space.

15. The building module as claimed in claim 1, wherein the fluid line is assigned a heat accumulator in order to take up and store heat from the heat transport medium and to emit stored heat to the heat transport medium.

16. The building module as claimed in claim 1, wherein the heat transfer element has a plurality of functional surfaces, and wherein a photovoltaic unit is arranged on at least one of the functional surfaces.

17. A building module in the form of a facade module, a roof module or a window module for utilizing solar energy and/or for thermal insulation, having:
a guide rail;
an inner pane and an outer pane, wherein an intermediate space is formed between the inner pane and the outer pane;
a heat transfer element that is mounted to the guide rail, that is arranged in the intermediate space, and that includes a solid body which extends along a longitudinal axis with at least one axial end section and at least one functional surface for absorbing thermal radiation and/or also for controlling the temperature of the intermediate space; and
a fluid system including a fluid line that is mounted to the guide rail, that includes an outer wall in which a heat transport medium is circulated, and that is formed outside of the heat transfer element, wherein the heat transfer element and the fluid line are arranged so that the longitudinal axis of the solid body is perpendicular to the outer wall of the fluid line, so that the at least one axial end section of the solid body is connected to the guide rail without extending into the heat transport medium circulating within the fluid line, and so that a thermal contact is formed between the at least one axial end section of the solid body and the outer wall of the fluid line at a location within the guide rail thereby allowing an exchange of heat between the heat transfer element and the heat transport medium.

18. A method for producing a building module in the form of a facade module, a roof module or a window module, the method having the steps of:
providing a fluid system including a fluid line that includes an outer wall in which a heat transport medium is circulated;
providing a heat transfer element that includes a solid body which extends along a longitudinal axis with at least one axial end section and at least one functional surface for absorbing heat radiation and/or for controlling the temperature of ambient air, wherein the fluid line is formed outside the heat transfer element;
arranging the heat transfer element and the fluid line so that the longitudinal axis of the solid body is perpendicular to the outer wall of the fluid line and so that the at least one axial end section of the solid body is externally connected to the outer wall of the fluid line without extending into the heat transport medium circulating within the fluid line;
forming a thermal contact between the at least one axial end section of the solid body and the outer wall of the fluid line, wherein the thermal contact is formed at a location within a frame of the building module thereby allowing an exchange of heat between the heat transfer element and the heat transport medium; and
connecting an inner pane and an outer pane to the fluid line such that an intermediate space, in which the heat transfer element is arranged, is formed between the inner pane and the outer pane.

19. The method as claimed in claim 18, wherein the at least one axial end section of the heat transfer element is connected to a guide rail of the fluid line.

20. The method as claimed in claim 19, wherein the at least one axial end section of the heat transfer element is introduced into the guide strip at an axial end of the guide strip.

21. The method as claimed in claim 20, wherein a plurality of heat transfer elements and a plurality of spacer elements are introduced alternately into the guide strip in order to space apart the heat transfer elements in an installed state.

\* \* \* \* \*